3,020,309
HALOCYCLOALKENYL BORATES AND
PREPARATION THEREOF
John P. Luvisi, Park Ridge, Ill., assignor to Universal Oil Products Company, Des Plaines, Ill., a corporation of Delaware
No Drawing. Filed Dec. 23, 1959, Ser. No. 861,463
18 Claims. (Cl. 260—462)

This invention relates to new compositions of matter and to a method for the preparation thereof. More particularly the invention relates to a method for the preparation of new compositions of matter comprising halocycloalkenyl borates which possess insecticidal activity.

An object of this invention is to prepare halocycloalkenyl borates which may be used as insecticides.

One embodiment of this invention resides in a process for the preparation of a halocycloalkenyl borate which comprises condensing a halo-substituted compound selected from the group consisting of halo-substituted alkadienes and halo-substituted cycloalkadienes with an alkenyl borate at condensation conditions to form the desired halocycloalkenyl borate.

A further embodiment of this invention resides in a process for the preparation of a halocycloalkenyl borate which comprises condensing a halo-substituted conjugated cycloalkadiene with an alkenyl borate at a temperature in the range of from about 25° to about 150° C. and at a pressure in the range of from about atmospheric to about 100 atmospheres to form the desired halocycloalkenyl borate.

A specific embodiment of the invention resides in a process for the preparation of a halocycloalkenyl borate which comprises condensing 1,3-dichloro-1,3-butadiene with an alkenyl borate at a temperature in the range of from about 25° to about 150° C. and at a pressure in the range of from about atmospheric to about 100 atmospheres to form the desired halocycloalkenyl borate.

A more specific embodiment of the invention resides in a process for the preparation of a halocycloalkenyl borate which comprises condensing hexachlorocyclopentadiene with trivinyl borate at a temperature in the range of from about 25° to about 150° C. and at a pressure in the range of from about atmospheric to about 100 atmospheres to form the desired tris-(1,4,5,6,7,7-hexachloro-5-norbornen-2-yl) borate.

Yet another embodiment of the invention is found in a halocycloalkenyl borate containing only carbon, hydrogen and halogen atoms.

Another specific embodiment of the invention is tris-[(3,5-dichloro-3-cyclohexen-1-yl)methyl] borate.

Other objects and embodiments referring to alternative halo-substituted alkadienes and cycloalkadienes and to alternative alkenyl borates will be found in the following further detailed description of the invention.

It has now been discovered that halocycloalkenyl borates which are prepared by condensing a halo-substituted cycloalkadiene with an alkenyl borate will find a wide variety of uses in the chemical field. For purposes of this invention the term "halocycloalkene" will refer to halocycloalkenes, polyhalocycloalkenes, halobicycloalkenes and polyhalobicycloalkenes, the term "halo" referring to both mono- and polyhalo-substituted compounds.

For example, the condensation product of hexachlorocyclopentadiene and triallyl borate, namely, tris-[(1,4,5,6,7,7-hexachloro-5-norbornen-2-yl)methyl] borate may be used as an insecticide, especially against houseflies. In addition, the reaction products of this invention may also be used as antioxidants, antiozidants or as intermediates in the preparation of resins, pharmaceuticals, plastics, etc.

The process of this invention in which the halo-substituted unsaturated compound comprising a conjugated alkadiene or conjugated cycloalkadiene is condensed with an alkenyl borate will take place at a temperature in the range of from about atmospheric (25°) to about 150° C. or more and often preferably at a temperature in the range of from about 100° to about 125° C., the temperature depending upon the reactants which are to be condensed or the reflux temperature of the organic solvent, if one is used. Generally, the reaction will take place at atmospheric pressure; however, if higher temperatures are used when condensing a lower boiling diene with the alkenyl borate, superatmospheric pressures ranging from about 2 to about 100 atmospheres will be used, the amount of pressure being necessary to maintain at least a portion of the reactants in the liquid phase. In addition, if so desired, the reaction will take place in the presence of substantially inert organic solvents including aromatic solvents such as benzene, toluene, o-, m- and p-xylene, ethyl benzene, etc.; alcohols such as methyl alcohol, ethyl alcohol, propyl alcohol, etc.; ethers such as dimethyl ether, diethyl ether, dipropyl ether, etc.; saturated aliphatic hydrocarbons such as pentane, hexane, heptane, etc.

Unsaturated compounds containing a halogen substituent which may be reacted with an alkenyl borate in the process of the present invention include (1) halogenated conjugated straight-chain diolefins containing only carbon, hydrogen and halogen atoms having the general formula:

in which the X's are independently selected from the group consisting of hydrogen or halogen radicals having an atomic weight of from 35 to 127 (i.e. chlorine, bromine or iodine), at least one of the X's being halogen and Y is independently selected from the group consisting of alkyl, haloalkyl, halogen and hydrogen radicals, or (2) halogenated conjugated cycloalkadienes containing only carbon, hydrogen and halogen atoms and having the general formula:

in which the X's have the same meaning as above and $n$ is 1 or 2. Examples of these compounds include haloalkadienes such as 1-chloro-1,3-butadiene,
1,3-dichloro-1,3-butadiene,
1-bromo-1,3-butadiene,
1,3-dibromo-1,3-butadiene,
1,3-diiodo-1,3-butadiene,
1,1,3-trichloro-1,3-butadiene,
1,1,3-tribromo-1,3-butadiene,
1-iodo-1,3-butadiene,
1,2-diiodo-1,3-butadiene,
1,1,3-triiodo-1,3-butadiene,
1,1,2-trichloro-1,3-butadiene,
1,1,2-tribromo-1,3-butadiene, 1,1,2-triiodo-1,3-butadiene,
1,1,4-trichloro-1,3-butadiene,
1,1,4-tribromo-1,3-butadiene,
1,1,4-triiodo-1,3-butadiene,
1,1,4,4-tetrachloro-1,3-butadiene,
1,1,4,4-tetrabromo-1,3-butadiene,
1,1,4,4-tetraiodo-1,3-butadiene,
1,1,2,3-tetrachloro-1,3-butadiene,
1,1,2,3-tetrabromo-1,3-butadiene,
1,1,2,3-tetraiodo-1,3-butadiene,
1,1,2,3,4-pentachloro-1,3-butadiene,
1,1,2,3,4-pentabromo-1,3-butadiene,
1,1,2,3,4-pentaiodo-1,3-butadiene,
Hexachloro-1,3-butadiene,
Hexabromo-1,3-butadiene,
Hexaiodo-1,3-butadiene,
1,3-dichloro-2-methyl-1,3-butadiene,
1,4-dichloro-2-methyl-1,3-butadiene,
1,1,4,4-tetrachloro-2-methyl-1,3-butadiene,
1,4-dichloro-2-chloromethyl-1,3-butadiene,
1,4-dichloro-2-dichloromethyl-1,3-butadiene,
1,1,4-trichloro-2-methyl-1,3-butadiene,
1,1,4,4-tetrachloro-2-methyl-1,3-butadiene,
1,1,4,4-tetrachloro-2-chloromethyl-1,3-butadiene,
1,3-dibromo-2-methyl-1,3-butadiene,
1,4-dibromo-2-methyl-1,3-butadiene,
1,1,4,4-tetrabromo-2-methyl-1,3-butadiene,
1,4-dibromo-2-bromomethyl-1,3-butadiene,
1,4-dibromo-2-dibromomethyl-1,3-butadiene,
1,1,4-tribromo-2-methyl-1,3-butadiene,
1,1,4,4-tetrabromo-2-methyl-1,3-butadiene,
1,1,4,4-tetrabromo-2-bromomethyl-1,3-butadiene,
1,3-diiodo-2-methyl-1,3-butadiene,
1,4-diiodo-2-methyl-1,3-butadiene,
1,1,4,4-tetraiodo-2-methyl-1,3-butadiene,
1,4-diiodo-2-iodomethyl-1,3-butadiene,
1,4-diiodo-2-diiodomethyl-1,3-butadiene,
1,1,4-triiodo-2-methyl-1,3-butadiene,
1,1,4,4-tetraiodo-2-methyl-1,3-butadiene,
1,1,4,4-tetraiodo-2-iodomethyl-1,3-butadiene, etc.;

halocycloalkadienes such as halogenated 1,3-cyclopentadienes which for purposes of this invention will be designated as halogenated cyclopentadienes including 1-chlorocyclopentadiene,
1,2-dichlorocyclopentadiene,
1,2,3-trichlorocyclopentadiene,
1,2,3,4-tetrachlorocyclopentadiene,
1,2,3,4,5-pentachlorocyclopentadiene,
Hexachlorocyclopentadiene,
1-bromocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
Hexabromocyclopentadiene,
1-iodocyclopentadiene,
1,2-diiodocyclopentadiene,
1,2,3-triiodocyclopentadiene,
1,2,3,4-tetraiodocyclopentadiene,
1,2,3,4,5-pentaiodocyclopentadiene,
Hexaiodocyclopentadiene, etc.

It is also contemplated within the scope of this invention that polyhalo-substituted conjugated cyclohexadienes such as 1,2-dichloro-1,3-cyclohexadiene,
1,2,3-trichloro-1,3-cyclohexadiene,
Octachloro-1,3-cyclohexadiene, etc.,
1,2-dibromo-1,3-cyclohexadiene,
1,2,3-tribromo-1,3-cyclohexadiene,
Octabromo-1,3-cyclohexadiene,
1,2-diiodo-1,3-cyclohexadiene,
1,2,3-triiodo-1,3-cyclohexadiene,
Octaiodo-1,3-cyclohexadiene, etc., may also be used. In addition, it is also contemplated that polyhaloalkadienes and polyhalocycloalkadienes which are used in this process may contain more than one species of halo substituents, such as, for example, 1,1-dichloro-3-bromo-1,3-butadiene,
1-chloro-3-bromo-1,3-butadiene,
1-iodo-3-chloro-1,3-butadiene,
2-bromo-3-chloro-1,3-butadiene,
1,4-dichloro-2-bromomethyl-1,3-butadiene,
1,4-dichloro-2-iodomethyl-1,3-butadiene,
1-chloro-2-bromocyclopentadiene,
1,2-dichloro-3-bromocyclopentadiene,
1,2-dichloro-5,5-dibromocyclopentadiene, etc., may be used although not necessarily with equivalent results.

Alkenyl borates containing only carbon, hydrogen, oxygen and boron atoms which may be condensed with the aforesaid halo-substituted alkadienes and halocycloalkadienes according to the process of this invention possess the generic formula:

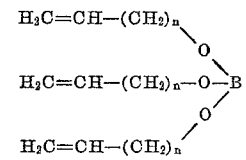

in which $n$ is an integer of from 0 to 10, said borates including trivinyl borate, triallyl borate, trimethallyl borate, tricrotonyl borate, tripentenyl borate, trihexenyl borate, triheptenyl borate, trioctenyl borate, trinonenyl borate, tridecenyl borate, etc. It is to be understood in the formula of the alkenyl borate the double bond may be at the end of the chain or may be internal and that the aforementioned halo-substituted conjugated alkadienes, halo-substituted conjugated cycloalkadienes and alkenyl borates are only representative of the class of compounds which may be used and that the present invention is not necessarily limited thereto.

An example of the condensation reaction of the present process may be illustrated by the following equations in which triallyl borate is reacted with 1,3-dichloro-1,3-butadiene and hexachlorocyclopentadiene, respectively, to form tris-[(3,5-dichloro-3-cyclohexen-1-yl)methyl] borate and tris[(1,4,5,6,7,7 - hexachloro - 5 - norbornen - 2-yl)methyl] borate, respectively:

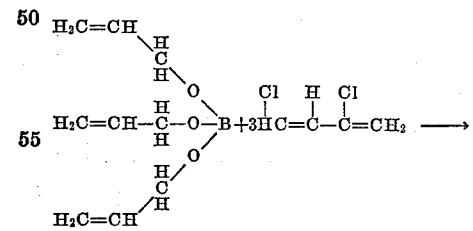

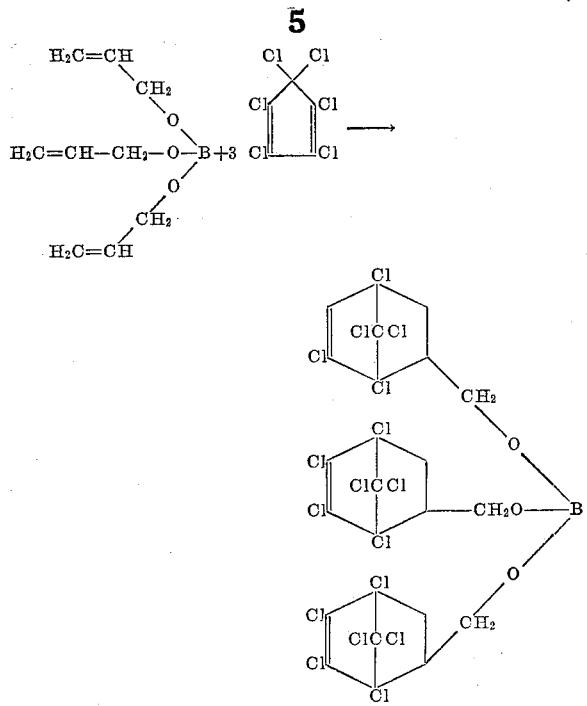

Although the above set forth equations illustrate the reaction between three moles of halo substituted alkadienes and cycloalkadienes with one mole of an alkenyl borate it is contemplated within the scope of this invention that one or two moles of the halo substituted compound may be reacted with one mole of the alkenyl borate to obtain a halocycloalkenyl alkenyl borate or a bis-(halocycloalkenyl) alkenyl borate respectively.

The physical properties of the present halocycloalkenyl borates and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, bees-wax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article, for example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of this invention may be effected in any suitable manner and may comprise either a batch or a continuous type operation. For example, when a batch type operation is used, a quantity of the starting materials comprising the alkenyl borate and, if so desired, an inert organic solvent is placed in a condensation apparatus provided with heating and mixing means. The flask is adjusted to the desired temperature and the haloalkadiene or halocycloalkadiene is added thereto at a predetermined rate, the temperature of the flask being maintained at the desired level for a predetermined residence time. At the end of this time the flask and contents thereof are allowed to cool to room temperature and the desired reaction product is separated from unreacted starting materials by conventional means such as fractional distillation, crystallization, etc. Alternatively, the reactants and solvent, if any, may be first admixed and then heated to the desired reaction temperature.

Another method of effecting the condensation reaction of the present invention is by a continuous type operation. In this type of operation the starting materials comprising the alkenyl borate and the halocycloalkadiene or haloalkadiene are continuously charged to a reactor which is maintained at the proper operating conditions of temperature and pressure. The reactor may comprise an unpacked vessel or coil or may be lined with an adsorbent packing material such as fire brick, alumina, dehydrated bauxite or the like. If so desired, an inert organic solvent of the type hereinbefore set forth may be added through a separate line or admixed with one or the other of the starting materials prior to entry into said reactor and charged thereto in a single stream. The reaction product is continuously withdrawn from the reactor, separated from the reactor effluent and purified by conventional means hereinbefore set forth, while the unreacted starting materials are separated and recharged to the reactor as a portion of the feed stock.

Examples of reaction products which are prepared according to the process of the present invention comprising halocycloalkenyl borates containing only carbon, hydrogen, oxygen, halogen and boron atoms include (2,5-dichloro-3-cyclohexen-1-yl) divinyl borate,
bis-(2,5-dichloro-3-cyclohexen-1-yl) vinyl borate,
tris-(2,5-dichloro-3-cyclohexen-1-yl) borate,
[(2,5-dichloro-3-cyclohexen-1-yl)methyl] diallyl borate,
bis-[(2,5-dichloro-3-cyclohexen-1-yl)methyl] allyl borate,
tris-[(2,5-dichloro-3-cyclohexen-1-yl)methyl] borate,
(3,5-dichloro-3-cyclohexen-1-yl) divinyl borate,
bis-(3,5-dichloro-3-cyclohexen-1-yl) vinyl borate,
tris-(3,5-dichloro-3-cyclohexen-1-yl) borate,
[(3,5-dichloro-3-cyclohexen-1-yl)methyl] diallyl borate,
bis-[(3,5-dichloro-3-cyclohexen-1-yl)methyl] allyl borate,
tris-[(3,5-dichloro-3-cyclohexen-1-yl)methyl] borate, (2,3,4,5-tetrachloro-3-cyclohexen-1-yl) divinyl borate,
bis-(2,3,4,5-tetrachloro-3-cyclohexen-1-yl) vinyl borate,
tris-(2,3,4,5-tetrachloro-3-cyclohexen-1-yl) borate,
[(2,3,4,5 - tetrachloro-3-cyclohexen-1-yl)methyl] diallyl borate,
bis-[(2,3,4,5 - tetrachloro-3-cyclohexen-1-yl)methyl] borate,
tris-[(2,3,4,5 - tetrachloro-3-cyclohexen-1-yl)methyl] borate,
(1,4-dichloro-5-norbornen-2-yl) divinyl borate,
bis-(1,4-dichloro-5-norbornen-2-yl) vinyl borate,
tris-(1,4-dichloro-5-norbornen-2-yl) borate,
[(1,4-dichloro-5-norbornen-2-yl)methyl] diallyl borate,
bis-[(1,4-dichloro-5-norbornen-2-yl)methyl] allyl borate,
tris-[(1,4-dichloro-5-norbornen-2-yl)methyl] borate,
(1,4,5,6-tetrachloro-5-norbornen-2-yl) divinyl borate,
bis-(1,4,5,6-tetrachloro-5-norbornen-2-yl) vinyl borate,
tris-(1,4,5,6-tetrachloro-5-norbornen-2-yl) borate,
[(1,4,5,6-tetrachloro-5-norbornen-2-yl)methyl] diallyl borate,
bis-[(1,4,5,6 - tetrachloro-5-norbornen-2-yl)methyl] allyl borate,
tris-[(1,4,5,6 - tetrachloro-5-norbornen-2-yl)methyl] borate,
(1,4,5,6,7,7-hexachloro-5-norbornen-2-yl) divinyl borate,
bis-(1,4,5,6,7,7 - hexachloro-5-norbornen-2-yl) vinyl borate,
tris-(1,4,5,6,7,7-hexachloro-5-norbornen-2-yl) borate,
[(1,4,5,6,7,7-hexachloro-5-norbornen-2-yl)methyl] diallyl borate,
bis-[(1,4,5,6,7,7-hexachloro - 5 - norbornen-2-yl)methyl] allyl borate,
tris-[(1,4,5,6,7,7-hexachloro - 5 - norbornen-2-yl)methyl] borate,
(2,5-dibromo-3-cyclohexen-1-yl) divinyl borate,
bis-(2,5-dibromo-3-cyclohexen-1-yl) vinyl borate,
tris-(2,5-dibromo-3-cyclohexen-1-yl) borate,
(3,5-dibromo-3-cyclohexen-1-yl) divinyl borate,
bis-(3,5-dibromo-3-cyclohexen-1-yl) vinyl borate,
tris-(3,5-dibromo-3-cyclohexen-1-yl) borate,
(1,4-dibromo-5-norbornen-2-yl) divinyl borate,
bis-(1,4-dibromo-5-norbornen-2-yl) vinyl borate,
tris-(1,4-dibromo-5-norbornen-2-yl) borate,
(1,4,5,6-tetrabromo-5-norbornen-2-yl) divinyl borate,
bis-(1,4,5,6-tetrabromo-5-norbornen-2-yl) vinyl borate,
tris-(1,4,5,6-tetrabromo-2-norbornen-2-yl) borate,
[(2,5-diiodo-3-cyclohexen-1-yl)methyl] allyl borate,
tris-[(2,5-diiodo-3-cyclohexen-1-yl)methyl] borate,
[(2,3,4,5-tetraiodo-3-cyclohexen-1-yl)methyl] diallyl borate,
bis-[(2,3,4,5-tetraiodo - 3 - cyclohexen-1-yl)methyl] allyl borate,
tris-[(2,3,4,5-tetraiodo-3-cyclohexen-1-yl)methyl] borate,
[(1,4-diiodo-5-norbornen-2-yl)methyl] diallyl borate,
bis-[(1,4-diiodo-5-norbornen-2-yl)methyl] allyl borate,
tris-[(1,4-diiodo-5-norbornen-2-yl)methyl] borate,
[(1,4,5,6,7,7 - hexaiodo-5-norbornen-2-yl)methyl] diallyl borate,
bis-[(1,4,5,6,7,7-hexaiodo-5-norbornen-2-yl)methyl] allyl borate,
tris-[(1,4,5,6,7,7-hexaiodo-5-norbornen-2-yl)methyl] borate, etc. It is to be understood that the above mentioned compounds are only representatives of the class of halocycloalkenyl borates and that the present invention is not necessarily limited thereto.

The following examples are given to illustrate the process of the present invention, which, however, are not intended to limit the generally broad scope of the present invention in strict accordance therewith.

*Example I*

A mixture of 81 g. (0.3 mole) of hexachlorocyclopentadiene and 18 g. (0.1 mole) of triallyl borate in 50 cc. of toluene was heated under reflux at a temperature of approximately 124°–130° C. for a period of about 22 hours. At the end of this time the flask contents thereof are allowed to cool and the toluene is removed by vacuum. The desired reaction product consisted of 87 g. of an amber crystalline solid. These crystals were purified by extracting with n-pentane, the thus purified white crystalline compound having a melting point of 235° C. The crystals were then subjected to analysis with the following results:

Calcd. for: $C_{24}H_{15}Cl_{18}O_3B_1$: C, 28.81; H, 1.51; Cl, 63.79; O, 4.80; B, 1.08. Found: C, 28.90; H, 1.64; Cl, 63.00; O, 5.03; B, 1.10.

The thus analyzed crystals comprised tris-[1,4,5,6,7,7-hexachloro-5-norbornen-2-yl)methyl] borate. To further identify the crystals, said crystals were converted to the known alcohol derivative by hydrolyzing using boiling water thus forming 1,2,3,4,7,7-hexachloro-5-hydroxymethyl-2-norbornene, the crystals having a melting point of 165° C. This corresponds to the literature value of a melting point of 165° C. for the above compound as shown in Journal of the American Chemical Society, 76, pp. 2709–2710 (1954).

*Example II*

A solution of 81 g. (0.3 mole) of hexachlorocyclopentadiene and 14 g. (0.1 mole) of trivinyl borate in 50 g. of xylene is refluxed for a period of about 20 hours. At the end of this time the flask and contents thereof are allowed to cool to room temperature and the xylene is removed in vacuum. The resulting reaction product is extracted with n-pentane and the purified crystals comprising tris-(1,4,5,6,7,7-hexachloro-5-norbornen-2-yl) borate are recovered.

*Example III*

In this example a solution of 37 g. (0.3 mole) of 1,3-dichloro-1,3-butadiene and 18 g. (0.1 mole) of triallyl borate is refluxed for a period of about 20 hours in 50 g. of toluene, after which the product is recovered and treated as described for the products of Example I and II above. The crystals comprising tris-[(3,5-dichloro-3-cyclohexen-1-yl)methyl] borate are recovered therefrom.

*Example IV*

A solution of 37 g. (0.3 mole) of 1,3-dichloro-1,3-butadiene and 14 g. (0.1 mole) of trivinyl borate in 50 g. of xylene is treated as described in Examples I to III above. The desired product, comprising crystals of tris-(3,5-dichloro-3-cyclohexen-1-yl) borate is recovered.

*Example V*

In this example 37 g. (0.3 mole) of 1,4-dichloro-1,3-butadiene and 14 g. (0.1 mole) of trivinyl borate in 50 g. of toluene is refluxed for a period of about 20 hours. The desired crystalline product is extracted with n-pentane and the desired reaction product, comprising crystals of (2,5-dichloro-3-cyclohexen-1-yl) borate is recovered.

*Example VI*

A mixture of equimolar portions, that is, 27 g. (0.1 mole) of hexachlorocyclopentadiene and 14 g. (0.1 mole) of trivinyl borate in 50 g. of xylene is refluxed for a period of about 20 hours. At the end of this time the flask and contents thereof are allowed to cool to room temperature and the xylene is removed in vacuum. The resulting reaction product is extracted with n-pentane and the purified crystals comprising (1,4,5,6,7,7-hexachloro-5-norbornen-2-yl) divinyl borate are recovered.

*Example VII*

A mixture of 24 g. (0.2 mole) of 1,3-dichloro-1,3-butadiene and 18 g. (0.1 mole) of triallyl borate is refluxed in toluene for a period of about 20 hours, after which the product is recovered and extracted with n-pentane. The desired reaction product comprising crystals of tris-[(3,5 - dichloro - 3 - cyclohexen-1-yl)methyl] allyl borate is recovered.

Example VIII

An insecticidal composition comprising 0.1% of tris[(1,4,5,6,7,7-hexachloro-5-bornen-2-yl)methyl] borate and 5% sugar in 50 ml. of bait was placed in a petri dish. The petri dish was placed in a stainless steel round cage containing adult houseflies. The aforesaid composition caused a 26% kill of the houseflies. Similar insecticidal tests using the compounds described in Examples II to VIII above will have similar results.

Example IX

To illustrate the antioxidant properties of the halocycloalkenyl borate which are prepared according to the process of this invention a test was run using white rubber which contained the following ingredients:

|   | Parts by weight |
|---|---|
| Pale crepe | 100 |
| Zinc oxide | 5 |
| Stearic acid | 3 |
| Sulfur | 3 |
| Benzothiazyl disulfide | 1 |
| Antioxidant, when used | 2 |

The rubber was cured at 284° F. for 40 minutes milled in a conventional manner and then cut into strips which were evaluated in a dynamic test. In this test the strips of rubber were subjected to 320 flexes per minute of from 0 to 20% elongation in an ozone cabinet at a temperature of 74° F. in the presence of 35 parts of ozone per million parts of air. The time to first cracks was determined. The sample of rubber which did not contain any additive cracked in 2 hours, while the sample which contained 2 parts by weight of tris-[(1,4,5,6,7,7-hexachloro-5-norbornen-2-yl)methyl] borate took from 4–7 hours before the first cracks were noticed.

I claim as my invention:

1. A process for the preparation of halocycloalkenyl borate which comprises condensing a halo-substituted compound selected from the group consisting of halo-substituted alkadienes and halo-substituted cycloalkadienes with an alkenyl borate at condensation conditions to form the desired halocycloalkenyl borate, said alkenyl borate being of the formula:

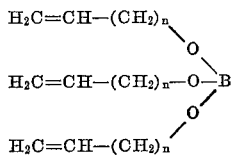

in which $n$ is an integer of from 0 to 10.

2. A process for the preparation of a halocycloalkenyl borate which comprises condensing a halo-substituted compound selected from the group consisting of halo-substituted alkadienes and halo-substituted cycloalkadienes with an alkenyl borate at a temperature in the range of from about 25° to about 150° C. and at a pressure in the range of from about atmospheric to about 100 atmospheres to form the desired halocycloalkenyl borate, said alkenyl borate being of the formula:

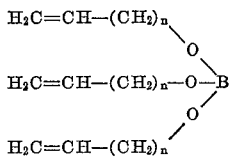

in which $n$ is an integer of from 0 to 10.

3. A process for the preparation of a halocycloalkenyl borate which comprises condensing a halo-substituted conjugated alkadiene with an alkenyl borate at a temperature in the range of from about 25° to about 150° C. and at a pressure in the range of from about atmospheric to about 100 atmospheres to form the desired halocycloalkenyl borate, said alkenyl borate being of the formula:

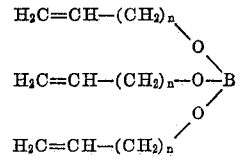

in which $n$ is an integer of from 0 to 10.

4. A process for the preparation of a halocycloalkenyl borate which comprises condensing a halo-substituted conjugated cycloalkadiene with an alkenyl borate at a temperature in the range of from about 25° to about 150° C. and at a pressure in the range of from about atmospheric to about 100 atmospheres to form the desired halocycloalkenyl borate, said alkenyl borate being of the formula:

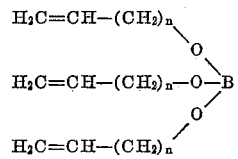

in which $n$ is an integer of from 0 to 10.

5. A process for the preparation of a chlorocycloalkenyl borate which comprises condensing 1,3-dichloro-1,3-butadiene with an alkenyl borate at a temperature in the range of from about 25° to about 150° C. and at a pressure in the range of from about atmospheric to about 100 atmospheres to form the desired chlorocycloalkenyl borate, said alkenyl borate being of the formula:

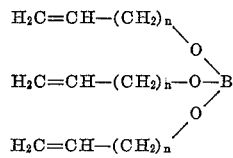

in which $n$ is an integer of from 0 to 10.

6. A process for the preparation of a cholorcycloalkenyl borate which comprises condensing 1,4-dichloro-1,3-butadiene with an alkenyl borate at a temperature in the range of from about 25° to about 150° C. and at a pressure in the range of from about atmospheric to about 100 atmospheres to form the desired chlorocycloalkenyl borate, said alkenyl borate being of the formula:

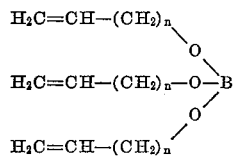

in which $n$ is an integer of from 0 to 10.

7. A process for the preparation of a chlorocycloalkenyl borate which comprises condensing hexachlorocyclopentadiene with an alkenyl borate at a temperature in the range of from about 25° to about 150° C. and at a pressure in the range of from about atmospheric to about 100 atmospheres to form the desired chlorocycloalkenyl borate, said alkenyl borate being of the formula:

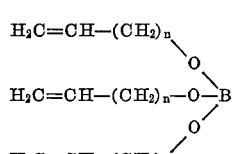

in which $n$ is an integer of from 0 to 10.

8. A process which comprises condensing hexachlorocyclopentadiene with trivinyl borate at a temperature in the range of from about 25° to about 150° C. and at a pressure in the range of from about atmospheric to about 100 atmospheres to form tris-(1,4,5,6,7,7-hexachloro-5-norbornen-2-yl) borate.

9. A process which comprises condensing hexachlorocyclopentadiene with triallyl borate at a temperature in the range of from about 25° to about 150° C. and at a pressure in the range of from about atmospheric to about 100 atmospheres to form tris[(1,4,5,6,7,7-hexachloro-5-norbornen-2-yl)methyl] borate.

10. A process which comprises condensing 1,3-dichloro-1,3-butadiene with triallyl borate at a temperature in the range of from about 25° to about 150° C. and at a pressure in the range of from about atmospheric to about 100 atmospheres to form tris-[(3,5-dichloro-3-cyclohexen-1-yl)methyl] borate.

11. A process which comprises condensing 1,3-dichloro-1,3-butadiene with trivinyl borate at a temperature in the range of from about 25° to about 150° C. and at a pressure in the range of from about atmospheric to about 100 atmospheres to form tris-(3,5-dichloro-3-cyclohexen-1-yl) borate.

12. A process which comprises condensing 1,4-dichloro-1,3-butadiene with trivinyl borate at a temperature in the range of from about 25° to about 150° C. and at a pressure in the range of from about atmospheric to about 100 atmospheres to form tris-(2,5-dichloro-3-cyclohexen-1-yl) borate.

13. A compound selected from the group consisting of tris-(1,4,5,6,7,7-hexachloro-5-norbornen-2-yl) borate, tris - [(1,4,5,6,7,7 - hexachloro-5-norbornen-2-yl)methyl] borate, tris - [(3,5 - dichloro - 3 - cyclohexen-1-yl)methyl] borate, (1,4,5,6,7,7-hexachloro-5-norbornen-2-yl) divinyl borate and bis-[(3,5-dichloro-3-cyclohexen-1-yl)methyl] allyl borate.

14. Tris - (1,4,5,6,7,7 - hexachloro - 5 - norbornen-2-yl) borate.

15. Tris-[(1,4,5,6,7,7 - hexachloro - 5 - norbornen-2-yl) methyl] borate.

16. Tris - [(3,5 - dichloro - 3 - cyclohexen-1-yl)methyl] borate.

17. (1,4,5,6,7,7 - hexachloro-5-norbornen-2-yl) divinyl borate.

18. Bis-[(3,5-dichloro-3-cyclohexen-1-yl)methyl] allyl borate.

No references cited.